United States Patent
Jin (10) Patent No.: US 12,252,012 B2
(45) Date of Patent: Mar. 18, 2025

(54) VEHICLE CONTROL METHOD AND VEHICLE, NON-TRANSITORY STORAGE MEDIUM AND CHIP

(71) Applicant: Xiaomi EV Technology Co., Ltd., Beijing (CN)

(72) Inventor: Cheng Jin, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 188 days.

(21) Appl. No.: 18/071,988

(22) Filed: Nov. 30, 2022

(65) Prior Publication Data

US 2023/0415570 A1 Dec. 28, 2023

(30) Foreign Application Priority Data

Jun. 24, 2022 (CN) .................... 202210723175.X (51) Int. Cl.
*B62D 5/00* (2006.01)
*B60K 31/00* (2006.01)
*B62D 5/04* (2006.01)
*B62D 6/04* (2006.01)

(52) U.S. Cl.
CPC ...... *B60K 31/0008* (2013.01); *B60K 31/0075* (2013.01); *B62D 5/0409* (2013.01); *B62D 5/0412* (2013.01); *B62D 5/0415* (2013.01); *B60K 2031/0033* (2013.01); *B60K 2031/0091* (2013.01)

(58) Field of Classification Search
CPC ........ B62D 5/008; B62D 5/04; B62D 5/0409; B62D 5/0412; B62D 5/0415; B62D 5/0421; B62D 5/0424; B62D 5/0427; B62D 6/04; B62D 15/025; B62D 15/0265

USPC .................................................... 701/41, 43
See application file for complete search history.

(56) References Cited

U.S. PATENT DOCUMENTS

| | | | |
|---|---|---|---|
| 2005/0125131 A1 | 6/2005 | Kato et al. | |
| 2005/0203705 A1* | 9/2005 | Izumi | B62D 5/008 340/436 |
| 2008/0004772 A1 | 1/2008 | Kobayashi | |
| 2008/0319612 A1 | 12/2008 | Kudo | |
| 2013/0124041 A1* | 5/2013 | Belser | G08G 1/168 701/41 |

(Continued)

FOREIGN PATENT DOCUMENTS

| CN | 109850009 A | 6/2019 |
|---|---|---|
| CN | 111791879 A | 10/2020 |

(Continued)

OTHER PUBLICATIONS

Wu, Y., Wang L, and Li F., "Research on Variable Steering Ratio Control Strategy of Steer-by-Wire System" SAE Technical Paper 2018-01-1583, 2018, doi:10.4271/2018-01-1583, Aug. 2018 (Aug. 2018), entire document; Type-A.

(Continued)

*Primary Examiner* — Erick R Solis
(74) *Attorney, Agent, or Firm* — Volpe Koenig (57) ABSTRACT

A vehicle control method, vehicle and non-transitory computer readable storage medium that enables a current transmission ratio of a vehicle to be decreased prior to a driver turning a steering wheel so that a larger steering angle of a wheel can be obtained when the driver turns the steering wheel at a smaller angle in emergency driving situations.

16 Claims, 6 Drawing Sheets

(56) References Cited

U.S. PATENT DOCUMENTS

| | | | |
|---|---|---|---|
| 2015/0307125 A1* | 10/2015 | Kunihiro | B62D 6/003 |
| | | | 701/42 |
| 2016/0009318 A1 | 1/2016 | Morotomi et al. | |
| 2018/0362076 A1* | 12/2018 | Rowell | F02D 11/105 |
| 2019/0193788 A1* | 6/2019 | Augst | B62D 15/025 |
| 2021/0011481 A1 | 1/2021 | Cho | |
| 2021/0394752 A1 | 12/2021 | Satoh | |

FOREIGN PATENT DOCUMENTS

| | | |
|---|---|---|
| CN | 113147747 A | 7/2021 |
| DE | 102008000941 A1 | 10/2009 |
| JP | 2000177616 A | 6/2000 |
| WO | 2022/062825 A1 | 3/2022 |

OTHER PUBLICATIONS

Extended European Search Report issued on Jun. 1, 2023 for European Patent Application No. 22210260.0.

\* cited by examiner

Fig. 7

VEHICLE CONTROL METHOD AND VEHICLE, NON-TRANSITORY STORAGE MEDIUM AND CHIP

CROSS REFERENCE TO RELATED APPLICATIONS

The disclosure is provided based on and claims priority to the Chinese Patent Application No. 202210723175.X, filed on Jun. 24, 2022, the entire contents of which are incorporated herein by reference.

BACKGROUND

With the gradual improvement of people's living standards, there are more and more vehicles on the road, and the vehicles have brought great conveniences to traveling of people. However, with emerging of more and more vehicles on the road, many vehicle manufacturers pay more attention to an issue of vehicle safety.

SUMMARY

The disclosure provides a vehicle control method and a vehicle, a non-transitory storage medium and a chip.

According to a first aspect of an example of the disclosure, a vehicle control method is provided and includes:
monitoring an accelerated speed of a target object in front of a vehicle, in which a moving direction of the target object is the same as a moving direction of the vehicle;
detecting an obstacle in front of the vehicle, in which the obstacle is a static obstacle, or a dynamic obstacle whose moving direction is different from the moving direction of the vehicle; and
reducing a current transmission ratio of the vehicle to a target transmission ratio under a condition that it is recognized that the accelerated speed of the target object in front of the vehicle meets a preset condition, and/or there is the obstacle in front of the vehicle, in which
a transmission ratio is a ratio of a steering angle of a steering wheel of the vehicle to a steering angle of a wheel of the vehicle.

According to a second aspect of an example of the disclosure, a vehicle is provided and includes:
a processor; and
a memory, configured to store instructions executable by the processor, in which
the processor is configured to:
implement steps of the vehicle control method provided by the first aspect of the disclosure.

According to a third aspect of an example of the disclosure, a non-transitory computer-readable storage medium is provided and stores a computer program instruction, in which the program instruction, when executed by a processor, implements steps of the vehicle control method provided by the first aspect of the disclosure.

According to a fourth aspect of an example of the disclosure, a chip is provided and includes a processor and an interface, in which the processor is configured to read an instruction so as to execute steps of the vehicle control method provided by the first aspect of the disclosure.

It should be understood that the above general description and the following detailed description are merely explanatory as examples rather than limit the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

DETAILED DESCRIPTION

Examples will be described here in detail, instances of which are shown in the accompanying drawings. When the following description refers to the accompanying drawings, unless otherwise represented, the same numeral in the different accompanying drawings represents the same or similar elements. Implementations described in the following examples do not represent all implementations consistent with the disclosure. Rather, they are merely examples of an apparatus and a method consistent with some aspects of the disclosure as detailed in appended claims.

It needs to be noted that all actions of obtaining a signal, information, or data in the disclosure are performed on the premise of conforming to corresponding data protection regulations and policies of the country where it is located and under the condition of being authorized by a corresponding apparatus owner.

In the related art, a current transmission ratio of a vehicle is controlled to decrease only after it is monitored that a driver turns a steering wheel so that a larger steering angle of a wheel can also be obtained to realize emergency turning, though the driver turns the steering wheel at a smaller angle.

However, this technology is a passive emergency turning practice, the transmission ratio is reduced only after it is recognized that the driver turns the steering wheel, and consequently, a transmission ratio output by the vehicle cannot meet the demand of the driver for emergency turning in time.

Figure 1:
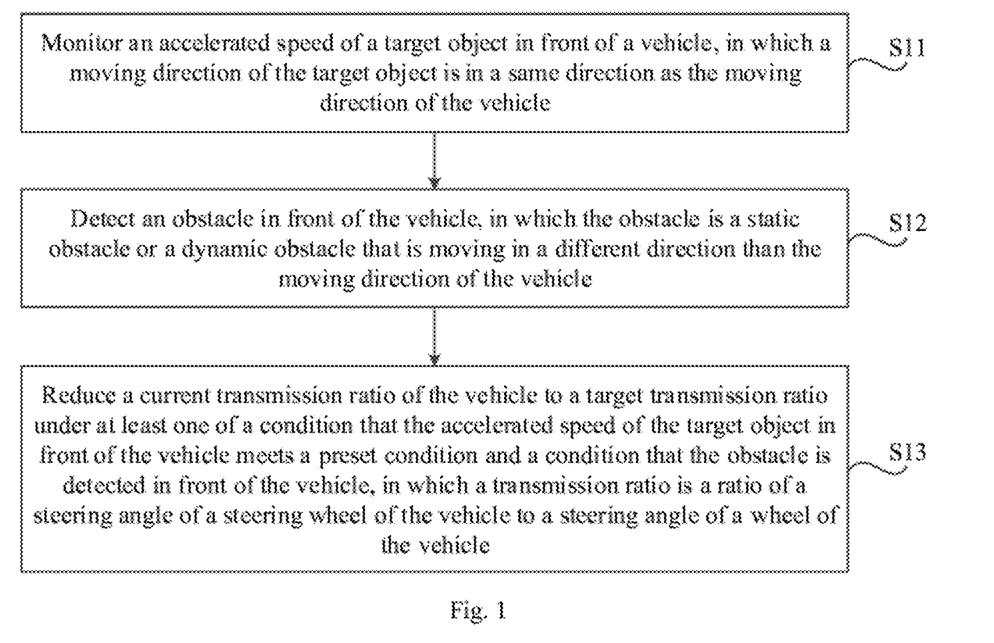
FIG. 1 is a flowchart of steps of a vehicle control method shown according to an example.

Please refer to a flowchart of steps of a vehicle control method shown in FIG. 1. The method includes the following steps.

In step S11, an accelerated speed of a target object in front of a vehicle is monitored, in which the moving direction of the target object is the same as the moving direction of the vehicle.

In this step, the target object may be a moving target object in front of the current vehicle, such as a target vehicle and a target robot. The moving direction of the target object is the same as the moving direction of the vehicle means that the target object in front of the current vehicle and the current vehicle travel on the same lane or different lanes, or the target object is located in front of the current vehicle, "front" may be "front-left," "front-right" or "directly front," which is not specifically limited by the disclosure.

The accelerated speed of the target object in front of the vehicle may be monitored through a camera.

In step S12, an obstacle in front of the vehicle is detected, in which the obstacle is a static obstacle or a dynamic obstacle whose moving direction is different from the moving direction of the vehicle.

In the step, the obstacle may be stone, a building, a tree, and other static obstacles, or may also be dynamic obstacles whose moving direction is different from the moving direction of the vehicle, such as a person, a vehicle, a robot, and a dog.

Figure 2:
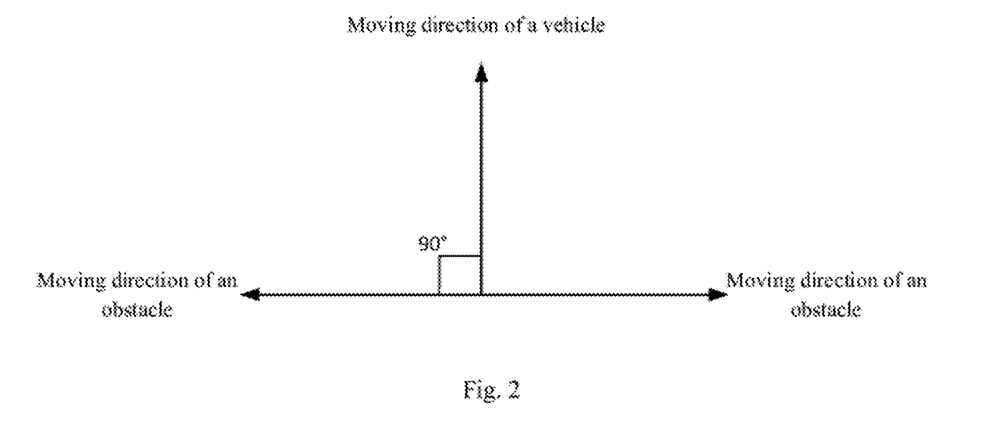
FIG. 2 is a schematic diagram of a traveling direction of an obstacle and a traveling direction of a vehicle shown according to an example.

Please refer to FIG. 2, the moving direction of the obstacle being different from the moving direction of the vehicle means that an included angle between the moving direction of the obstacle and the moving direction of the vehicle is located between a first included angle and a second included angle, the first included angle is 90 degrees, and the second included angle is 270 degrees.

In step S13, a current transmission ratio of the vehicle is reduced to a target transmission ratio under the condition that it is recognized that the accelerated speed of the target object in front of the vehicle meets a preset condition, and/or there is the obstacle in front of the vehicle, in which a transmission ratio is a ratio of a steering angle of a steering wheel of the vehicle to a steering angle of a wheel of the vehicle.

In the step, when it is recognized that the accelerated speed of the target object in front of the vehicle meets the preset condition, it indicates that the target object is undergoing emergency turning or emergency braking; under the condition that it is recognized that there is the static obstacle in front of the vehicle, it indicates that the current vehicle cannot continue traveling forwards and may bump against the static obstacle; and under the condition that it is recognized that there is the dynamic obstacle in front of the current vehicle whose moving direction is different from the moving direction of the current vehicle, it indicates that there is the dynamic obstacle in front of the current vehicle which suddenly appears.

Accordingly, under the condition that it is recognized that the target object is undergoing emergency turning or emergency braking, or there is a static obstacle in front of the current vehicle and the vehicle cannot continue traveling forwards, or there is a dynamic obstacle in front of the current vehicle which suddenly appears, it indicates that a driver of the current vehicle may perform emergency turning so as to avoid bumping against the target object and obstacle in front, at the moment, the current transmission ratio of the vehicle may be reduced to the target transmission ratio, so that the steering angle of the wheel of the vehicle realized through turning the steering wheel at the same angle by the driver is improved, and the demand of the driver for emergency turning can be met merely after the steering angle of the wheel of the vehicle is improved.

The larger the transmission ratio is, the smaller the steering angle of the wheel of the vehicle realized through turning the steering wheel at the same angle by the driver; and the smaller the transmission ratio is, the larger the steering angle of the wheel of the vehicle realized through turning the steering wheel at the same angle by the driver is.

The preset condition includes: a transverse acceleration threshold and a longitudinal acceleration threshold, and the accelerated speed includes a transverse acceleration and a longitudinal acceleration.

Through the vehicle control method provided by the disclosure, the current transmission ratio of the current vehicle may be reduced in advance under the condition that it is recognized that the accelerated speed of the target object in front of the current vehicle meets the preset condition, and/or there is the static obstacle or dynamic obstacle in front of the vehicle.

Accordingly, under the condition that it is determined that the target object in front of the current vehicle is undergoing emergency braking or emergency turning, and/or it is determined that there is a static obstacle in front of the current vehicle or the dynamic obstacle suddenly appears, it is determined that the driver may perform emergency turning in order to avoid the target object and/or the obstacle, at the moment, the current transmission ratio of the current vehicle may be reduced in advance, so that the transmission ratio can be actively reduced before the driver turns the steering wheel but not passively reduced after the driver turns the steering wheel. Thus, the demand of the driver for a low transmission ratio is met in time, so the driver nimbly controls the steering g angle of the wheel of the vehicle by using the low transmission ratio while turning the steering wheel so as to realize emergency turning.

In a possible implementation, the target object in front of the current vehicle has transverse acceleration and longitudinal acceleration, so it can have the following two cases to reduce the current transmission ratio of the current vehicle to the target transmission ratio.

First case: the current transmission ratio of the vehicle is reduced to the target transmission ratio under the condition that it is recognized that the transverse acceleration of the target object is greater than the transverse acceleration threshold.

Under the condition that it is recognized that the transverse acceleration of the target object is greater than the transverse acceleration threshold, it indicates that the target object is undergoing emergency turning, the target object which is directly in front of, or in front-left of or in front-right of the current vehicle and undergoing emergency turning may bump against the current vehicle, the driver may also perform emergency turning under the condition that the target object in front is undergoing emergency turning so as to avoid bumping against the obstacle in front.

In order to meet the demand of the driver for emergency turning in time, the current transmission ratio of the vehicle may be reduced in advance to the target transmission ratio. In this way, after the current transmission ratio of the vehicle is reduced, the steering angle of the wheel of the vehicle realized through turning the steering wheel at the same angle by the driver is larger, so the demand of the driver for emergency turning is met in time.

In the process of reducing the current transmission ratio of the vehicle to the target transmission ratio, a transmission ratio compensation value of the vehicle may be determined according to a transverse acceleration difference value between the transverse acceleration of the target object and the corresponding transverse acceleration threshold and a calibration parameter corresponding to a speed of the vehicle, and then the current transmission ratio of the vehicle is reduced to the target transmission ratio according to the current transmission ratio of the vehicle and the transmission ratio compensation value of the vehicle.

The target transmission ratio may be determined through the following formula:

$$a1 = a - (Ay - Ay')/B \quad \text{Formula} \tag{1}$$

In Formula (1), a1 is the target transmission ratio, a is the current transmission ratio of the vehicle, Ay is the transverse acceleration of the target object, Ay' is the transverse acceleration threshold, and B is the calibration parameter determined according to the speed of the current vehicle.

It can be seen from Formula (1) that the transverse acceleration difference value (Ay-Ay' in Formula (1)) and the transmission ratio compensation value (a-a1 in Formula (1)) are in a direct proportion relation, the more the transverse acceleration of the target object in front exceeds the transverse acceleration threshold, the larger the transmission ratio compensation value is, the more the transmission ratio of the vehicle is reduced currently.

When the more the transverse acceleration of the target object in front exceeds the transverse acceleration threshold, that is, the larger the transverse acceleration difference value is, it indicates that the situation of emergency turning of the target object in front is more urgent, in order to meet the demand of the driver of the current vehicle for more urgent emergency turning, the transmission ratio of the vehicle needs to be reduced more currently, that is, the transmission ratio compensation value is larger, and thus, the demand of the driver for more urgent driving turning can be met by using the smaller target transmission ratio.

Figure 3:
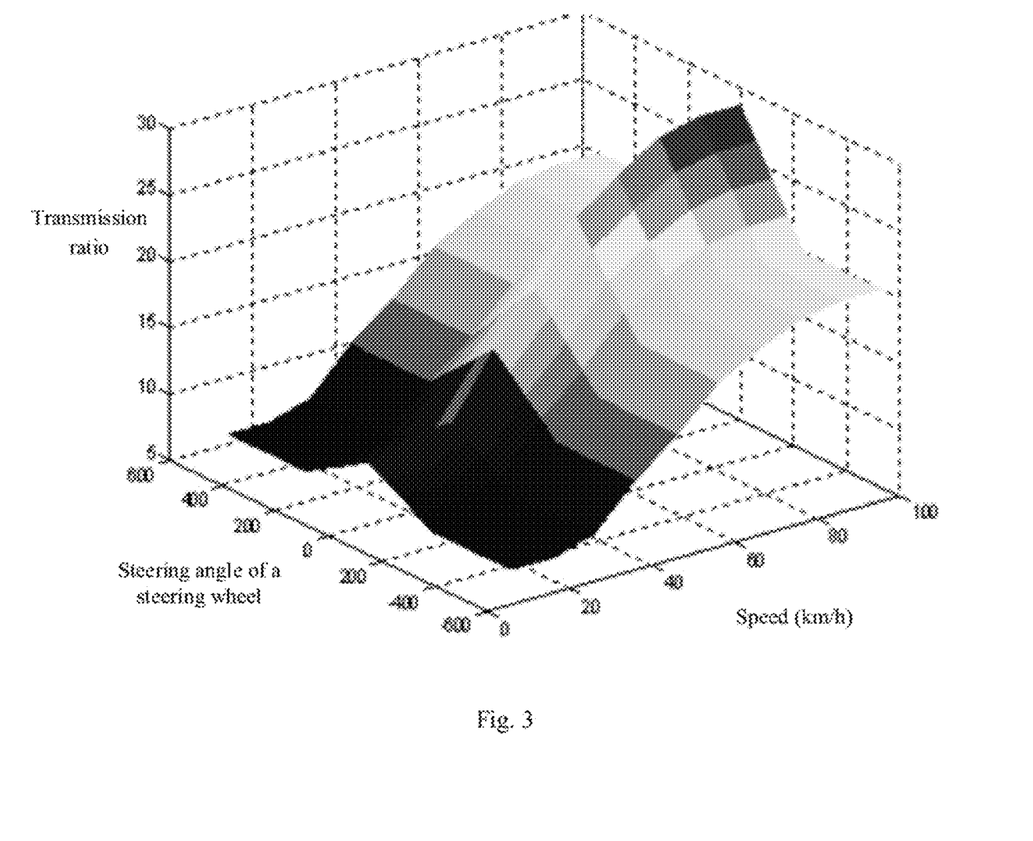
FIG. 3 is a diagram of a relation among a vehicle speed, a steering angle of a steering wheel and a transmission ratio shown according to an example.

Please refer to FIG. 3, an axis 0-100 represents the speed of the current vehicle, an axis −600 to 600 represents the steering angle of the steering wheel, and an axis 5-30 represents the transmission ratio.

The speed of the current vehicle and a value B has a direct proportion corresponding relation, the higher the speed of the current vehicle is, the larger the value B is, the smaller a value 1/B is; and the lower the speed of the current vehicle is, the smaller the value B is, the larger the value 1/B is.

It can be seen from FIG. 3 that the speed of the current vehicle may also affect control over the target transmission ratio, and the lower the speed of the current vehicle is, the smaller the transmission ratio is. Thus, it can be known by application of 1/B that the lower the speed of the vehicle is, the smaller the value B is, the larger the value 1/B is, the larger the corresponding transmission ratio compensation value is, at the moment, the target transmission ratio obtained according to the larger transmission ratio compensation value is smaller.

Thus, in view of an influence of the speed of the current vehicle and the transverse acceleration difference value between the transverse acceleration and the transverse acceleration threshold on the transmission ratio compensation value and an influence of the current speed of the vehicle on the transmission ratio compensation value, the transmission ratio compensation value may be obtained through the formula (Ay−Ay')/B, and then the target transmission ratio is obtained. The target transmission ratio a1 may be obtained according to the transverse acceleration difference value Ay−Ay', the current transmission ratio a of the vehicle and the calibration parameter B corresponding to the speed of the vehicle.

The larger the transverse acceleration difference value is, it indicates that the speed of emergency turning of the target object is higher; and the larger the transmission ratio compensation value is, it indicates that the lower the target transmission ratio is, the larger the steering angle of the wheel of the vehicle capable of being realized through turning the steering wheel at the same angle by a user is.

The target transmission ratio is obtained through Formula (1), when the transverse acceleration of the target object in front exceeds the transverse acceleration threshold much more, the smaller target transmission ratio is obtained, the steering angle of the wheel of the vehicle realized through turning the steering wheel at the same angle by the driver is improved, and the demand of the driver for more urgent emergency turning is met; when the current speed of the vehicle is lower and the larger value 1/B is obtained correspondingly, the smaller target transmission ratio is obtained, the steering angle of the wheel of the vehicle realized through turning the steering wheel at the same angle by the driver is improved, and a demand of the driver for parking is met; and when the current speed of the vehicle is higher, the smaller value 1/B is obtained correspondingly, the larger target transmission ratio is obtained, so the steering angle of the wheel of the vehicle realized through turning the steering wheel at the same angle by the driver is reduced, and traveling stability of the current vehicle is improved.

Second case: under the condition that it is recognized that the longitudinal acceleration of the target object is smaller than the longitudinal acceleration threshold, the current transmission ratio of the vehicle is reduced to the target transmission ratio.

The longitudinal acceleration refers to a brake acceleration of the vehicle, which is usually a negative value, so under the condition that it is recognized that the longitudinal acceleration of the target object is smaller than the longitudinal acceleration threshold, it indicates that the target object is undergoing emergency braking, the target object which is directly in front of, or in front-left of or in front-right of the current vehicle and undergoing emergency braking may bump against the current vehicle, the driver may perform emergency turning under the condition that the target object in front is undergoing emergency braking so as to avoid bumping against the obstacle in front.

In order to meet the demand of the driver for emergency turning in time, the current transmission ratio of the vehicle may be reduced in advance to the target transmission ratio, in this way, after the current transmission ratio of the vehicle is reduced, the steering angle of the wheel of the vehicle realized through turning the steering wheel at the same angle by the driver is larger, and thus the demand of the driver for emergency turning is met in time.

In a process of reducing the current transmission ratio of the vehicle to the target transmission ratio, a transmission ratio compensation value of the vehicle may be determined according to a longitudinal acceleration difference value between the longitudinal acceleration of the target object and the corresponding longitudinal acceleration threshold and the calibration parameter corresponding to the speed of the vehicle, and then the current transmission ratio of the vehicle is reduced to the target transmission ratio according to the current transmission ratio of the vehicle and the transmission ratio compensation value of the vehicle.

The target transmission ratio may be determined through the following formula:

$$a1 = a - |Ax - Ax'|/C \qquad \text{Formula (2)}$$

In Formula (2), a1 is the target transmission ratio, a is the current transmission ratio of the vehicle, Ax is the longitudinal acceleration of the target object, Ax' is the longitudinal acceleration threshold, and C is the calibration parameter determined according to the speed of the current vehicle.

It can be seen from Formula (2) that the longitudinal acceleration difference value and the transmission ratio compensation value are in a direct proportion relation, and the more the longitudinal acceleration of the target object in front is smaller than the longitudinal acceleration threshold, the more the transmission ratio of the vehicle is reduced currently.

When the longitudinal acceleration of the target object in front is smaller than the longitudinal acceleration threshold, it indicates that a situation of emergency braking of a target object in front is more urgent, so that the demand of the driver of the current vehicle for more urgent emergency turning. In order to meet the demand of the driver of the current vehicle for more urgent emergency turning, the transmission ratio of the vehicle needs to be reduced much more currently, in this way, the demand of the driver for more urgent driving turning can be met by using the smaller target transmission ratio.

It can be seen from FIG. 3 that the speed of the current vehicle may also affect control over the target transmission ratio, and the lower the speed of the current vehicle is, the smaller the transmission ratio is. Accordingly, it can be known by application of 1/C that the lower the speed of the vehicle is, the smaller a value C is, the larger a value 1/C is, and the larger the corresponding transmission ratio compensation value is, at the moment, the target transmission ratio obtained according to the larger transmission ratio compensation value is smaller.

Thus, in view of an influence of the speed of the current vehicle and the longitudinal acceleration difference value between the longitudinal acceleration and the longitudinal acceleration threshold on the transmission ratio compensation value and an influence of the current speed of the vehicle on the transmission ratio compensation value C, the transmission ratio compensation value may be obtained through formula $|Ax-Ax'|/C$, and then the target transmission ratio is obtained. The target transmission ratio a1 may be obtained according to the longitudinal acceleration difference value $Ax-Ax'$, the current transmission ratio a of the vehicle and the calibration parameter C corresponding to the speed of the vehicle.

The larger an absolute value of the longitudinal acceleration difference value is, it indicates that a speed of emergency braking of the target object is higher; and the larger the transmission ratio compensation value is, it indicates that the lower the target transmission ratio is, the larger the steering angle of the wheel of the vehicle capable of being realized through turning the steering wheel at the same angle by the user is.

The target transmission ratio is obtained through Formula (2), when the longitudinal acceleration of the target object in front is smaller than the longitudinal acceleration threshold, the smaller target transmission ratio may be obtained, the steering angle of the wheel of the vehicle realized through turning the steering wheel at the same angle by the driver is improved, and the demand of the driver for more urgent emergency turning is met.

In a possible implementation, under the condition that it is recognized that the accelerated speed of the target object meets the preset condition and it is recognized that the speed of the vehicle is greater than a speed threshold, the current transmission ratio of the vehicle is reduced to the target transmission ratio; and under the condition that it is recognized that the accelerated speed of the target object meets the preset condition and it is recognized that the speed of the vehicle is smaller than or equal to the speed threshold, the current transmission ratio of the vehicle is maintained.

Under the condition that it is recognized that the transverse acceleration of the target object is greater than the transverse acceleration threshold and it is recognized that the speed of the vehicle is greater than the speed threshold, it indicates that the vehicle, in a process of high-speed traveling, meets the target object in front which is undergoing emergency turning, at the moment, the current transmission ratio of the current vehicle may be reduced to the target transmission ratio so as to meet the demand of the driver of the current vehicle for emergency turning.

Under the condition that it is recognized that the longitudinal acceleration of the target object is smaller than the longitudinal acceleration threshold and it is recognized that the speed of the vehicle is greater than the speed threshold, it indicates that the vehicle, in the process of high-speed traveling, meets the target object in front which is undergoing emergency braking, at the moment, the current transmission ratio of the current vehicle may be reduced to the target transmission ratio so as to meet the demand of the driver of the current vehicle for emergency turning.

Under the condition that it is recognized that the accelerated speed of the target object meets the preset condition and it is recognized that the speed of the vehicle is lower than or equal to the speed threshold, it indicates that the current vehicle, in a process of low-speed traveling, meets the target object in front which is undergoing emergency braking or emergency turning, as a traveling speed of the current vehicle is low, the driver may have longer time to avoid the target object in front, at the moment, the current transmission ratio of the current vehicle may be maintained.

In a possible implementation, in a process of turning of the current vehicle, if the current transmission ratio of the vehicle is reduced suddenly, consequently, in a process of the turning the steering wheel by the driver, the driver may suddenly feel that the steering angle of the wheel of the vehicle is increased, which interferes with turning for the driver, so the disclosure further includes the following steps.

Step S21: under the condition that it is recognized that the steering angle of the steering wheel of the vehicle is smaller than a first preset angle, if it is recognized that the accelerated speed of the target object meets the preset condition, the current transmission ratio of the vehicle is reduced to the target transmission ratio.

In the step, under the condition that it is recognized that the steering angle of the steering wheel of the vehicle is smaller than the first preset angle, it indicates that the current vehicle is undergoing straight driving or a turning amplitude is small, at the moment, if it is recognized that the transverse acceleration of the target object is greater than the transverse acceleration threshold, or the longitudinal acceleration of the target object is smaller than the longitudinal acceleration threshold, it indicates that the driver is more likely to perform emergency turning to avoid the target object, at the moment, the current transmission ratio of the vehicle may be reduced to the target transmission ratio so as to meet the demand of the driver for emergency turning.

The first preset angle may be a steering angle of the steering wheel within 50 degrees.

Under the condition that it is recognized that the steering angle of the steering wheel of the vehicle is smaller than a second preset angle, the current transmission ratio of the vehicle is recovered to a transmission ratio not compensated in a current state.

After the current transmission ratio of the vehicle is reduced to the target transmission ratio, if it is recognized that the steering angle of the steering wheel of the vehicle is smaller than the second preset angle, it indicates that the current vehicle does not need to perform emergency turning, at the moment, the current transmission ratio of the vehicle may be recovered to the transmission ratio not compensated in the current state so as to meet a demand of the user for normally driving the vehicle.

The second preset angle may be the same as the first preset angle, or may also be different from the first preset angle, which is limited according to actual specific conditions.

Step S22: under the condition that it is recognized that the steering angle of the steering wheel of the vehicle is greater than or equal to the first preset angle, if it is recognized that the accelerated speed of the target object meets the preset condition, the current transmission ratio of the vehicle is maintained.

In the step, under the condition that it is recognized that the steering angle of the steering wheel of the vehicle is greater than or equal to the first preset angle, it indicates that the current vehicle is undergoing large-amplitude turning, at the moment, if it is recognized that the transverse acceleration of the target object is greater than the transverse acceleration threshold, or the longitudinal acceleration of the target object is smaller than the longitudinal acceleration threshold, a transmission ratio of the current vehicle during turning is maintained so as to avoid a situation that sudden reduction of the transmission ratio causes the driver to suddenly feel that the steering angle of the wheel of the vehicle is increased in the process of turning the steering wheel, so that interference with turning for the driver is avoided, and driving safety of the vehicle is improved.

Figure 4:
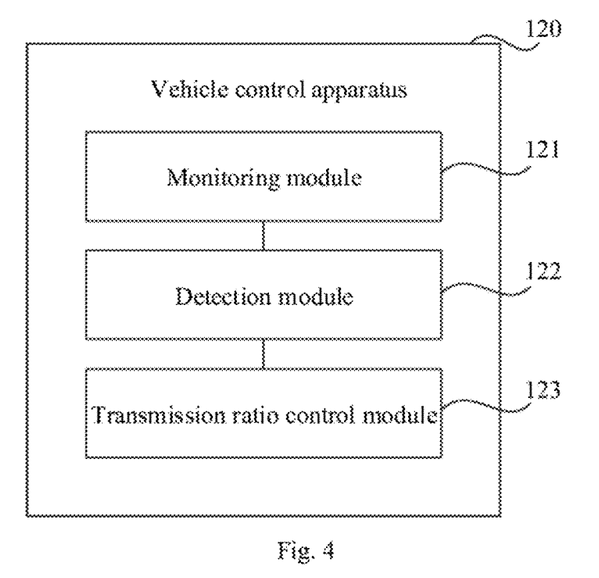
FIG. 4 is a block diagram of a vehicle control apparatus shown according to an example.

FIG. 4 is a block diagram of a vehicle control apparatus 120 shown according to an example. Refer to FIG. 4, the apparatus 120 includes: a monitoring module 121, a detection module 122 and a transmission ratio control module 123.

The monitoring module 121 is configured to monitor an accelerated speed of a target object in front of a vehicle, in which a moving direction of the target object is the same as a moving direction of the vehicle.

The detection module 122 is configured to detect an obstacle in front of the vehicle, in which the obstacle is a static obstacle, or a dynamic obstacle whose moving direction is different from the moving direction of the vehicle.

The transmission ratio control module 123 is configured to reduce a current transmission ratio of the vehicle to a target transmission ratio under the condition that it is recognized that the accelerated speed of the target object in front of the vehicle meets a preset condition, and/or there is the obstacle in front of the vehicle, in which a transmission ratio is a ratio of a steering angle of a steering wheel of the vehicle to a steering angle of a wheel of the vehicle.

Alternatively, the accelerated speed includes a transverse acceleration, and the preset condition includes a transverse acceleration threshold.

The transmission ratio control module 123 includes:

a first transmission ratio control module, configured to reduce the current transmission ratio of the vehicle to the target transmission ratio under the condition that it is recognized that the transverse acceleration of the target object is greater than the transverse acceleration threshold.

Alternatively, the accelerated speed includes a longitudinal acceleration, and the preset condition includes a longitudinal acceleration threshold.

The transmission ratio control module 123 includes:

a second transmission ratio control module, configured to reduce the current transmission ratio of the vehicle to the target transmission ratio under the condition that it is recognized that the longitudinal acceleration of the target object is smaller than the longitudinal acceleration threshold.

Alternatively, the transmission ratio control module 123 includes:

a transmission ratio compensation value calculation module, configured to determine a transmission ratio compensation value of the vehicle according to an acceleration difference value between the accelerated speed of the target object and a corresponding acceleration threshold and a calibration parameter corresponding to a speed of the vehicle; and a third transmission ratio control module, configured to reduce the current transmission ratio of the vehicle to the target transmission ratio according to the current transmission ratio of the vehicle and the transmission ratio compensation value of the vehicle, in which under the condition that the accelerated speed is the transverse acceleration, the acceleration threshold is the transverse acceleration threshold; and under the condition that the accelerated speed is the longitudinal acceleration, the acceleration threshold is the longitudinal acceleration threshold.

Alternatively, the transmission ratio control module 123 includes:

a fourth transmission ratio control module, configured to reduce the current transmission ratio of the vehicle to the target transmission ratio under the condition that it is recognized that the accelerated speed of the target object meets the preset condition and it is recognized that the speed of the vehicle is greater than a speed threshold.

Alternatively, the transmission ratio control module 123 includes:

a fifth transmission ratio control module, configured to reduce the current transmission ratio of the vehicle to the target transmission ratio if it is recognized that the accelerated speed of the target object meets the preset condition under the condition that it is recognized that the steering angle of the steering wheel of the vehicle is smaller than a first preset angle.

a sixth transmission ratio control module, configured to maintain the current transmission ratio of the vehicle if it is recognized that the accelerated speed of the target object meets the preset condition under the condition that it is recognized that the steering angle of the steering wheel of the vehicle is greater than or equal to the first preset angle.

Alternatively, the apparatus 120 further includes:

a seventh transmission ratio control module, configured to recover the current transmission ratio of the vehicle to a transmission ratio not compensated in a current state under the condition that it is recognized that the steering angle of the steering wheel of the vehicle is smaller than a second preset angle.

Figure 5:
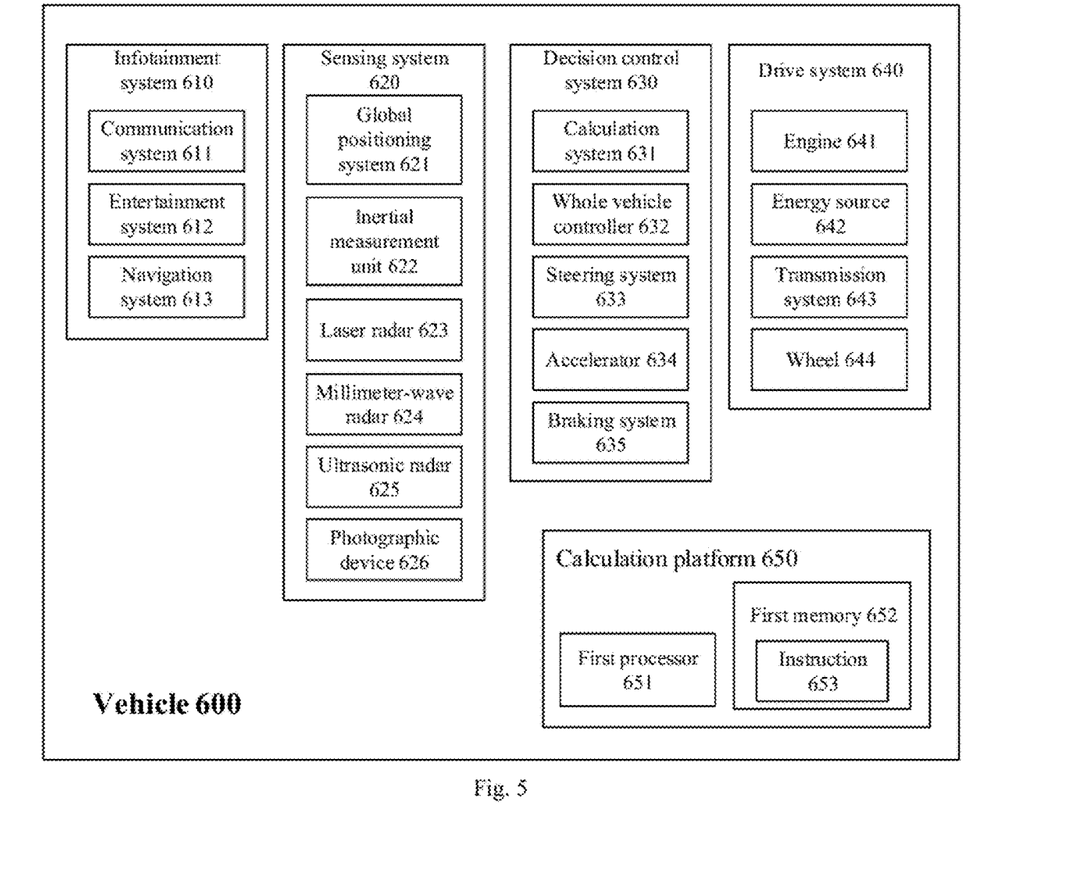
FIG. 5 is a schematic block diagram of functions of a vehicle shown according to an example (a common structure of the vehicle).

Refer to FIG. 5, which is a schematic block diagram of functions of a vehicle 600 shown by an example. The vehicle 600 may be configured to be in a full self-driving mode or a partial self-driving mode. For example, the vehicle 600 may obtain its surrounding environment information through a sensing system 620 and obtain a self-driving strategy based on an analysis of the surrounding environment information to realize full self-driving or present an analysis result to a user to realize partial self-driving.

The vehicle 600 may include various sub-systems, for example, an infotainment system 610, the sensing system 620, a decision control system 630, a drive system 640 and a calculation platform 650. Alternatively, the vehicle 600 may include more or fewer sub-systems, and each sub-system may include a plurality of components. Besides, each sub-system and component of the vehicle 600 may be interconnected in a wired or wireless mode.

In some examples, the infotainment system 610 may include a communication system 611, an entertainment system 612 and a navigation system 613.

The communication system 611 may include a wireless communication system, and the wireless communication system may perform wireless communication with one or more devices directly or via a communication network. For example, the wireless communication system may adopt a 3G cellular communication, for example, CDMA, EVD0, GSM/GPRS, or a 4G cellular communication, for example LTE, or 5G cellular communication. The wireless communication system may communicate with a wireless local area network (WLAN) by using WiFi. In some examples, the wireless communication system may perform direct communication with the device by using an infrared link, Bluetooth or ZigBee. As for other wireless protocols, for example, various vehicle communication systems, for example, the wireless communication system may include one or more dedicated short range communications (DSRC) devices, and these devices may include public and/or private data communications between vehicles and/or roadside stations.

The entertainment system 612 may include a display device, a microphone and a stereo, a user may listen to the radio or play music in a vehicle based on the entertainment system; or connect a mobile phone to the vehicle to realize a projection screen of the mobile phone on the display device, and the display device may be in a touch mode, so the user may operate by touching a screen.

In some cases, a voice signal of the user may be obtained through the microphone, and certain control over the vehicle 600 may be realized by the user according to an analysis of the voice signal of the user, for example, adjusting an in-vehicle temperature and the like. In some other cases, music may be played to the user through the stereo.

The navigation system 613 may include a map service provided by a map provider, so as to provide navigation of a driving route for the vehicle 600, and the navigation system 613 may be matched with a global positioning system 621 and an inertial measurement unit 622 of the vehicle for use. The map service provided by the map provider may be a two-dimensional map, or may also be an HD map.

The sensing system 620 may include a plurality of sensors that sense information about a surrounding environment of the vehicle 600. For example, the sensing system 620 may include the global positioning system 621 (the global positioning system may be a GPS, or may also be a Beidou system or other positioning systems), the inertial measurement unit (IMU) 622, a laser radar 623, a millimeter-wave radar 624, an ultrasonic radar 625 and a photographic device 626. The sensing system 620 may also include sensors (for example, an in-vehicle air quality monitor, a fuel gauge, oil thermometer and the like) of an internal system of the monitored vehicle 600. Sensor data from one or the plurality of these sensors may be used for detecting an object and its corresponding features (a position, a shape, a direction, a speed and the like). The detection and recognition are key functions of the safe operation of the vehicle 600.

The global positioning system 621 is configured to estimate the geographical location of the vehicle 600.

The inertial measurement unit 622 is configured to sense pose change of the vehicle 600 based on an inertia acceleration. In some examples, the inertial measurement unit 622 may be a combination of an accelerometer and a gyroscope.

The laser radar 623 senses an object in an environment where the vehicle 600 is located by using laser light. In some examples, the laser radar 623 may include one or a plurality of laser sources and laser scanners and one or a plurality of detectors, and other system components.

The millimeter-wave radar 624 senses the object in the surrounding environment of the vehicle 600 by using a radio signal. In some examples, besides sensing the object, the millimeter-wave radar 624 may also be configured to sense a speed and/or a heading direction of the object.

The ultrasonic radar 625 may sense the object around the vehicle 600 by using an ultrasonic wave signal.

The photographic device 626 is configured to capture image information of the surrounding environment of the vehicle 600. The photographic device 626 may include a monocular camera, a binocular camera, a structured light camera, a panorama camera and the like. The image information obtained by the photographic device 626 may include a static image, or may also include video streaming information.

The decision control system 630 includes a calculation system 631 for performing analysis and decisions based on the information obtained by the sensing system 620. The decision control system 630 may also include a whole vehicle controller 632 for controlling a power system of the vehicle 600, and a steering system 633, an accelerator 634 and a braking system 635 for controlling the vehicle 600.

The calculation system 631 may operate to process and analyze various information obtained by the sensing system 620 so as to recognize a target, an object and/or features in the surrounding environment of the vehicle 600. The target may include a pedestrian or an animal, and the object and/or the features may include a traffic signal, a road boundary and an obstacle. The calculation system 631 may adopt technologies such as an object recognition algorithm, a structure from motion (SFM) algorithm and video tracking. In some examples, the calculation system 631 may be configured to draw a map for the environment, track the object, estimate the speed of the object, and the like. The calculation system 631 may analyze various obtained information and obtain a control strategy for the vehicle.

The whole vehicle controller 632 may be configured to perform coordination control over a power battery and an engine 641 of the vehicle so as to improve the power performance of the vehicle 600.

The steering system 633 may operate to adjust a heading direction of the vehicle 600. For example, in an example, the steering system may be a steering wheel system.

The accelerator 634 is configured to control an operation speed of the engine 641 and then control the speed of the vehicle 600.

The braking system 635 is configured to control the vehicle 600 to slow down. The braking system 635 may make wheels 644 slow down by using the force of friction. In some examples, the braking system 635 may convert the kinetic energy of the wheels 644 to an electric current. The braking system 635 may reduce a rolling speed of the wheels 644 in other modes so as to control the speed of the vehicle 600.

The drive system 640 may include a component for proving power for the vehicle 600. In an example, the drive system 640 may include the engine 641, an energy source 642, a transmission system 643 and the wheels 644. The engine 641 may be an internal combustion engine, a motor, a compressed air engine, or a combination of other types of engines, for example, a hybrid engine composed of a gasoline engine and the motor, and a hybrid engine composed of the internal combustion engine and the compressed air engine. The engine 641 converts the energy source 642 to mechanical energy.

Examples of the energy source 642 include gasoline, diesel oil, other oil-based fuel, propane, other fuels based on compressed gas, ethyl alcohol, a solar panel, a battery, and other electricity sources. The energy source 642 may also provide energy for other systems of the vehicle 600.

The transmission system 643 may transmit mechanical power from the engine 641 to the wheels 644. The transmission system 643 may include a gearbox, a differential mechanism and a drive shaft. In an example, the transmission system 643 may also include other devices, for example, a clutch. The drive shaft may include one or a plurality of shafts capable of being coupled to one wheel 644 or the plurality of wheels 644.

Part of or all of the functions of the vehicle 600 are controlled by the calculation platform 650. The calculation platform 650 may include at least one first processor 651, the first processor 651 may execute an instruction 653 stored in a non-transitory computer-readable medium such as a first memory 652. In some examples, the calculation platform 650 may also control individual components of the vehicle 600 or a plurality of calculation devices of the sub-systems in a distributed mode.

The first processor 651 may be any conventional processor, such as a commercially available CPU. Alternatively, the first processor 651 may also include, for example, a graphic process unit (GPU), a field programmable gate array (FPGA), a system on chip (SOC), an application specific integrated circuit (ASIC) or their combinations. Though FIG. 5 functionally illustrates the processor, a memory and other elements of a computer in the same blocks, those ordinarily skilled in the art should understand that the processor, the computer or the memory may actually include a plurality of processors, computers or memories which can be stored or not stored in the same physical shell. For example, the memory may be a hard disk drive, or other storage media located in what is different from a shell of the computer. Thus, reference to the processor or the computer may be constructed as including a reference to a set of processors or computers or memories which can be in parallel operation or not in parallel operation. Differing from using a single processor to execute the steps described here, for example, each of some components such as a steering component and a speed reducing component may have its own processor, and the processor executes merely calculation related to functions of a specific component.

In implementations of the disclosure, the first processor 651 may execute the above vehicle control method.

In the various aspects described here, the first processor 651 may be located far from the vehicle and perform wireless communication with the vehicle. In other aspects, some of the processes described here are executed on a processor arranged in the vehicle; the other processes are executed by a remote processor, which includes taking the necessary steps of executing a single operation.

In some examples, the first memory 652 may contain the instruction 653 (for example, program logics), and the instruction 653 may be executed by the first processor 651 to execute various functions of the vehicle 600. The first memory 652 may also contain extra instructions, including instructions sending data to one or more of the infotainment system 610, the sensing system 620, the decision control system 630 and the drive system 640, receiving data from them and interacting with them and/or controlling them.

Besides the instruction 653, the first memory 652 may also store data, for example, a road map, route information, a location, a direction and a speed of the vehicle, and other vehicle data like this, and other information. This type of information may be used by the vehicle 600 and the calculation platform 650 during operation of the vehicle 600 in an autonomous mode, or a semi-autonomous mode and/or a manual mode.

The calculation platform 650 may control the functions of the vehicle 600 based on an input received from the various sub-systems (for example, the drive system 640, the sensing system 620 and the decision control system 630). For example, the calculation platform 650 may control the steering system 633 by using an input from the decision control system 630 so as to avoid the obstacle detected by the sensing system 620. In some examples, the calculation platform 650 may operate to provide control over various aspects of the vehicle 600 and its sub-systems.

Alternatively, one or the plurality of the above components may be installed separated from the vehicle 600 or associated with the vehicle. For example, the first memory 652 may exist separated partially or completely from the vehicle 600. The above components may be coupled together through communication in a wired and/or wireless mode.

Alternatively, the above components are only examples, during actual application, all of the above modules may have additional components or the components may be deleted according to actual demands, and FIG. 5 should not be constructed as a limitation on the examples of the disclosure.

A self-driving car traveling on a road, such as the above vehicle 600, may recognize the object in its surrounding environment to determine the adjustment of a current speed. The object may be other vehicles, a traffic control device, or other types of objects. In some examples, each recognized object may be considered separately, and based on its own features of the object, such as its current speed, its accelerated speed, and a gap from the vehicle, a speed to be adjusted for the self-driving car may be determined.

Alternatively, the vehicle 600 or sensing and calculation devices (for example, the calculation system 631 and the calculation platform 650) associated with the vehicle 600 may predict an action of the recognized object based on the features of the recognized object and a state of the surrounding environment (for example, traffic, rain, ice on the road and the like). Alternatively, each recognized object depends on the action of one another, so all the recognized objects may also be considered together to predict the action of a single recognized object. The vehicle 600 can adjust its speed based on the predicted action of the recognized object. In other words, the self-driving car can determine to which type of stable state (for example, speed up, speed down or stopping) the vehicle will need to be adjusted based on the predicted action of the object. In this process, other factors may also be considered to determine the speed of the vehicle 600, for example, a transverse location of the vehicle 600 in a road where the vehicle is traveling, a curvature of the road, closeness of a static or dynamic object and the like.

Besides providing an instruction for adjusting the speed of the self-driving car, the calculation device may also provide an instruction for modifying a turning angle of the vehicle 600, so as to make the self-driving car conform to a given trajectory and/or maintain a safe transverse and longitudinal distance between the self-driving car and the object (for example, a vehicle on an adjacent lane on the road) nearby the self-driving car.

The above vehicle 600 may be various types of traffic tools, for example, a car, a truck, a motorbike, a bus, a ship, an airplane, a helicopter, a rec vee, a train and the like, which is not particularly limited by the examples of the disclosure.

Figure 6:
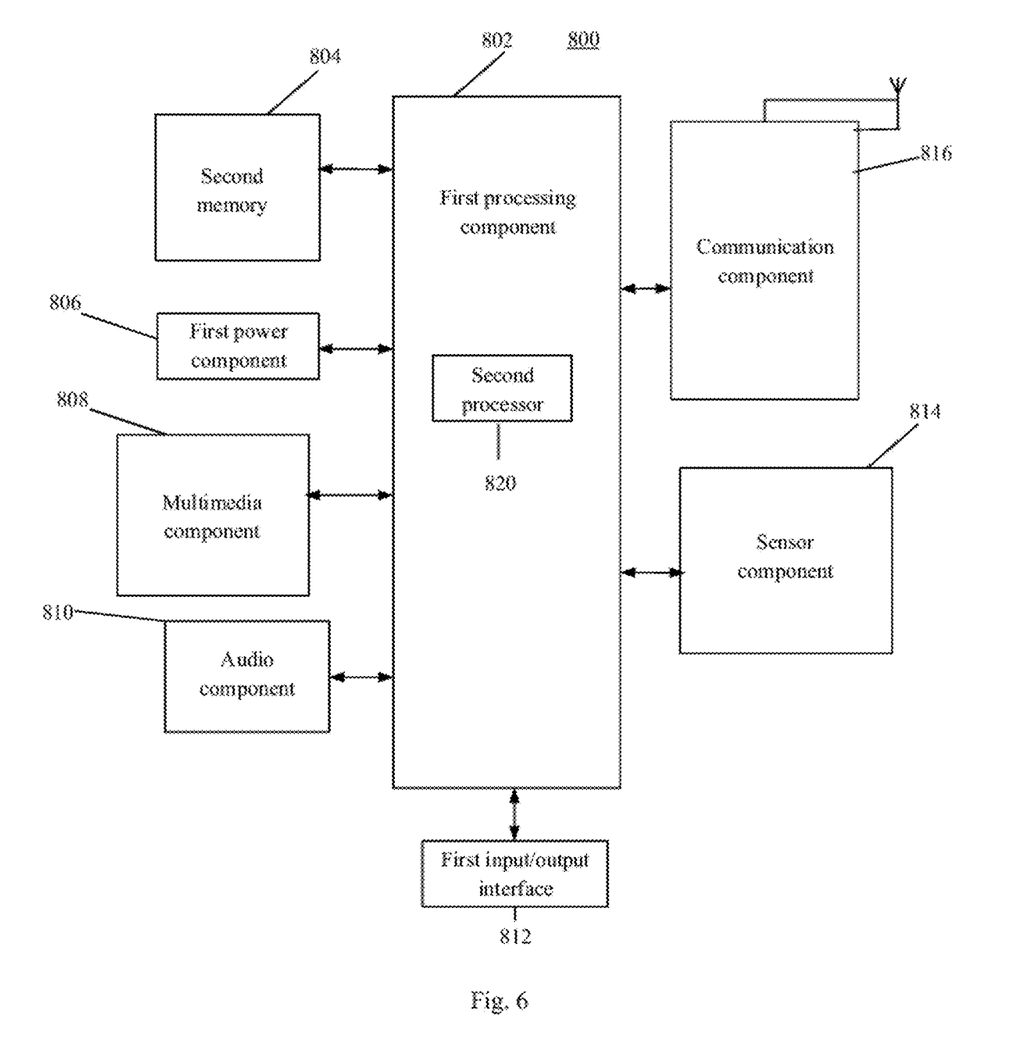
FIG. 6 is a block diagram of an apparatus shown according to an example (a common structure of a mobile terminal).

FIG. 6 is a block diagram of an apparatus 800 for vehicle control shown according to an example. For example, the apparatus 800 may be a mobile phone, a computer, a digital broadcast terminal, a messaging device, a game console, a tablet device, a medical device, a fitness facility, a personal digital assistant and the like.

Refer to FIG. 6, the apparatus 800 may include one or more components as follows: a first processing component 802, a second memory 804, a first power component 806, a multimedia component 808, an audio component 810, a first input/output (I/O) interface 812, a sensor component 814 and a communication component 816.

The first processing component 802 generally controls the whole operation of the apparatus 800, such as operations related to display, phone call, data communication, camera operation and recording operation. The first processing component 802 may include one or more second processors 820 for executing the instructions so as to complete all or part of steps of the above vehicle control method. Besides, the first processing component 802 may include one or more modules to facilitate interaction between the first processing component 802 and the other components. For example, the first processing component 802 may include a multimedia module so as to facilitate interaction between the multimedia component 808 and the first processing component 802.

The second memory 804 is configured to store various data so as to support operations on the apparatus 800. Examples of these data include instructions of any application program or method for operation on the apparatus 800, contact person data, telephone directory data, messages, pictures, videos and the like. The second memory 804 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The first power component 806 provides power for the various components of the apparatus 800. The first power component 806 may include a power management system, one or more power sources, and other components related to power generation, management and distribution for the apparatus 800.

The multimedia component 808 includes a screen that provides an output interface between the apparatus 800 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a back camera. When the apparatus 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the apparatus 800 is in the operation mode, such as a call mode, a recording mode and a voice recognition mode, the microphone is configured to receive an external audio signal. The received audio signal may be further stored in a second memory 804 or sent via the communication component 816. In some examples, the audio component 810 may further include a speaker for outputting the audio signal.

The first I/O interface 812 provides an interface between the first processing component 802 and a peripheral interface module, and the peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the apparatus 800. For example, the sensor component 814 may detect a start/shut-down state of the apparatus 800 and the relative positioning of the components, and for example, the components are a display and a keypad of the apparatus 800. The sensor component 814 may further detect position change of the apparatus 800 or one component of the apparatus 800, whether there is contact between the user and the apparatus 800, and azimuth or speed up/speed down and temperature change of the apparatus 800. The sensor component 814 may include a proximity sensor, configured to detect the existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the apparatus 800 and the other devices. The apparatus 800 may be accessed to a wireless network based on a communication standard, such as WiFi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be realized based on a radio frequency identification (RFID) technology, an infra-red data association (IrDA) technology, an ultra-wide band (UWB) technology, a Bluetooth (BT) technology and other technologies.

In an example, the apparatus 800 may be realized by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above vehicle control method.

In an example, a non-transitory computer-readable storage medium including instructions is further provided, such as a second memory 804 including the instructions, the above instructions may be executed by a second processor 820 of the apparatus 800 so as to complete the above vehicle control method. For example, the non-transitory computer-readable storage medium may be an ROM, a random access memory (RAM), a CD-ROM, a magnetic tape, a floppy disk, an optical data storage device, and the like.

Besides an independent electronic device, the apparatus may also be part of the independent electronic device, for example, in an example, the apparatus may be an integrated circuit (IC) or a chip, and the integrated circuit may be one IC, or a set of a plurality of ICs. The chip may include but is not limited to the following types: a graphics processing unit (GPU), a central processing unit (CPU), a field programmable gate array (FPGA), a digital signal processor (DSP), an application specific integrated circuit (ASIC), a system on chip (SOC), and the like. The above integrated circuit or chip may be configured to execute an executable instruction (or a code) so as to implement the above vehicle control method. The executable instruction may be stored in the integrated circuit or chip, or may also be obtained from other apparatuses or devices, for example, the integrated circuit or chip includes a processor, a memory and an interface configured to communicate with the other apparatuses. The executable instruction may be stored in the processor, and the executable instruction, when executed by the processor, implements the above vehicle control method. Or the integrated circuit or chip may receive the executable instruction through the interface and transmit the instruction to the processor to be executed, so as to implement the above vehicle control method.

In another example, a computer program product is further provided. The computer program product contains a computer program capable of being executed by a programmable apparatus. The computer program has a code part that is used for executing the above vehicle control method when executed by the programmable apparatus.

Figure 7:
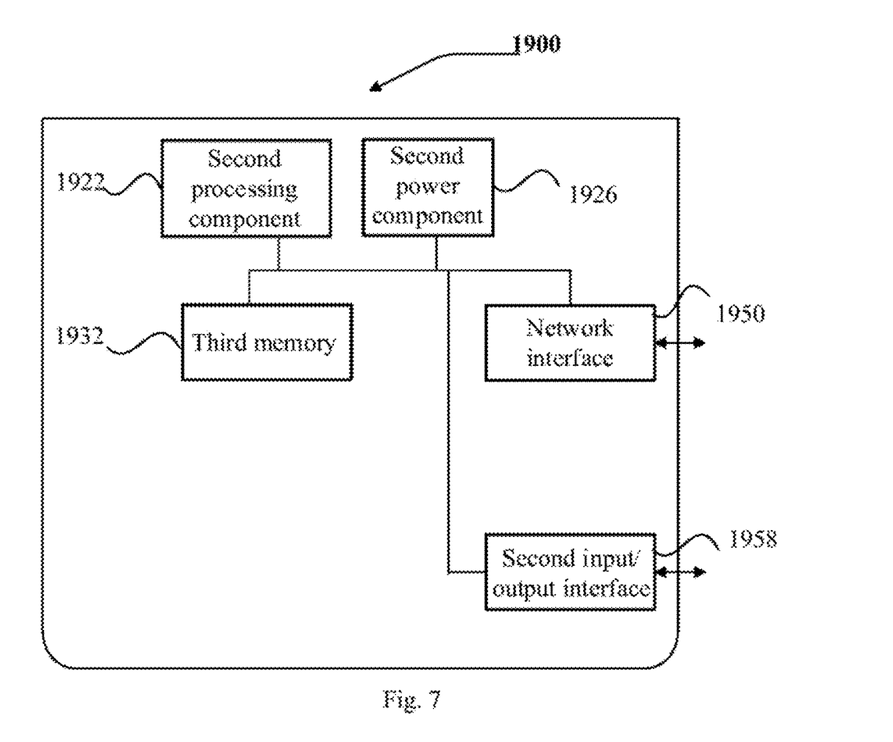
FIG. 7 is a block diagram of an apparatus shown according to an example (a common structure of a server).

FIG. 7 is a block diagram of an apparatus 1900 for vehicle control shown according to an example. For example, the apparatus 1900 may be provided as a server. Refer to FIG. 7, the apparatus 1900 includes a second processing component 1922 which further includes one or a plurality of processors, and a memory resource represented by a third memory 1932 used for storing an instruction executable by the second processing component 1922, for example, an application program. The application program stored in the third memory 1932 may include one or more than one module each of which corresponds to a set of instructions. Besides, the second processing component 1922 is configured to execute the instructions so as to execute the above vehicle control method.

The apparatus 1900 may further include a second power component 1926 configured to execute power management of the apparatus 1900, a wired or wireless network interface 1950 configured to connect the apparatus 1900 to a network, and a second input/output interface 1958. The apparatus 1900 may operate an operating system stored in the third memory 1932, for example, Windows Server™, Mac OS X™, Unix™, Linux, FreeBSD™ or the like.

Those skilled in the art will easily figure out other implementation solutions of the disclosure after considering the specification and practicing the disclosure. The disclosure intends to cover any transformation, application or adaptive change of the disclosure which conforms to a general principle of the disclosure and includes common general knowledge or conventional technical means which are not disclosed by the disclosure in the technical field. The specification and the examples are only regarded as examples, and the true scope and spirit of the disclosure are indicated by the following claims.

It should be understood that the disclosure is not limited to an accurate structure described above and shown in the accompanying drawings and accepts various modifications and changes without departing from its scope. The scope of the disclosure is limited merely by the appended claims.

What is claimed is:

1. A vehicle control method, comprising:
   monitoring an accelerated speed of a target object in front of a vehicle, wherein a moving direction of the target object is in a same direction as the moving direction of the vehicle;
   detecting an obstacle in front of the vehicle, wherein the obstacle is a static obstacle, or a dynamic obstacle that is moving in a different direction than the moving direction of the vehicle;
   reducing a transmission ratio of the vehicle to a target transmission ratio under a condition that the accelerated speed of the target object in front of the vehicle meets a preset condition and the obstacle is detected in front of the vehicle; and
   maintaining the transmission ratio of the vehicle in response to determining that the accelerated speed of the target object meets the preset condition under the condition that a steering angle of a steering wheel of the vehicle is greater than or equal to a first preset angle,
   wherein the transmission ratio is a ratio of the steering angle of the steering wheel of the vehicle to a steering angle of a wheel of the vehicle.

2. The vehicle control method according to claim 1, wherein the accelerated speed comprises a transverse acceleration, and the preset condition comprises a transverse acceleration threshold; and
   reducing the transmission ratio of the vehicle to the target transmission ratio under the condition that the accelerated speed of the target object in front of the vehicle meets the preset condition comprises:
   reducing the transmission ratio of the vehicle to the target transmission ratio under the condition that the transverse acceleration of the target object is greater than the transverse acceleration threshold.

3. The vehicle control method according to claim 1, wherein the accelerated speed comprises a longitudinal acceleration, and the preset condition comprises a longitudinal acceleration threshold; and
   reducing the transmission ratio of the vehicle to the target transmission ratio under the condition that the accelerated speed of the target object in front of the vehicle meets the preset condition comprises:
   reducing the transmission ratio of the vehicle to the target transmission ratio under the condition that the longitudinal acceleration of the target object is smaller than the longitudinal acceleration threshold.

4. The vehicle control method according to claim 1, wherein reducing the transmission ratio of the vehicle to the target transmission ratio comprises:
   determining a transmission ratio compensation value of the vehicle according to an acceleration difference value between the accelerated speed of the target object and a corresponding acceleration threshold as well as a calibration parameter corresponding to a speed of the vehicle; and
   reducing the transmission ratio of the vehicle to the target transmission ratio according to the transmission ratio of the vehicle and the transmission ratio compensation value of the vehicle, wherein
   the acceleration threshold is a transverse acceleration threshold under the condition that the accelerated speed is a transverse acceleration, and the acceleration threshold is a longitudinal acceleration threshold under the condition that the accelerated speed is a longitudinal acceleration.

5. The vehicle control method according to claim 1, wherein reducing the transmission ratio of the vehicle to the target transmission ratio under the condition that the accelerated speed of the target object in front of the vehicle meets the preset condition comprises:
reducing the transmission ratio of the vehicle to the target transmission ratio under the condition that the accelerated speed of the vehicle meets the preset condition and a speed of the vehicle is greater than a speed threshold.

6. The vehicle control method according to claim 1, wherein reducing the transmission ratio of the vehicle to the target transmission ratio under the condition that the accelerated speed of the target object in front of the vehicle meets the preset condition comprises:
reducing the transmission ratio of the vehicle to the target transmission ratio in response to determining that the accelerated speed of the target object meets the preset condition under the condition that the steering angle of the steering wheel of the vehicle is smaller than the first preset angle.

7. The vehicle control method according to claim 1, wherein after reducing the transmission ratio of the vehicle, the method comprises:
recovering the transmission ratio of the vehicle to a transmission ratio not compensated in a current state under the condition that the steering angle of the steering wheel of the vehicle is smaller than a second preset angle.

8. A vehicle, comprising:
a processor; and
a memory, configured to store instructions executable by the processor, wherein
the processor is configured to:
monitor an accelerated speed of a target object in front of the vehicle, wherein a moving direction of the target object is a same direction as the moving direction of the vehicle;
detect an obstacle in front of the vehicle, wherein the obstacle is a static obstacle, or a dynamic obstacle that is moving in a different direction than the moving direction of the vehicle;
reduce a transmission ratio of the vehicle to a target transmission ratio under a condition that the accelerated speed of the target object in front of the vehicle meets a preset condition and the obstacle is detected in front of the vehicle; and
maintain the transmission ratio of the vehicle in response to determining that the accelerated speed of the target object meets the preset condition under the condition that a steering angle of a steering wheel of the vehicle is greater than or equal to a first preset angle,
wherein the transmission ratio is a ratio of the steering angle of the steering wheel of the vehicle to a steering angle of a wheel of the vehicle.

9. The vehicle according to claim 8, wherein the accelerated speed comprises a transverse acceleration, and the preset condition comprises a transverse acceleration threshold; and the processor is further configured to:
reduce the transmission ratio of the vehicle to the target transmission ratio under the condition that the transverse acceleration of the target object is greater than the transverse acceleration threshold.

10. The vehicle according to claim 8, wherein the accelerated speed comprises a longitudinal acceleration, and the preset condition comprises a longitudinal acceleration threshold; and the processor is further configured to:

reduce the transmission ratio of the vehicle to the target transmission ratio under the condition that the longitudinal acceleration of the target object is smaller than the longitudinal acceleration threshold.

11. The vehicle according to claim 8, wherein the processor is further configured to:
determine a transmission ratio compensation value of the vehicle according to an acceleration difference value between the accelerated speed of the target object and a corresponding acceleration threshold as well as a calibration parameter corresponding to a speed of the vehicle; and
reduce the transmission ratio of the vehicle to the target transmission ratio according to the transmission ratio of the vehicle and the transmission ratio compensation value of the vehicle, wherein
the acceleration threshold is a transverse acceleration threshold under the condition that the accelerated speed is a transverse acceleration, and the acceleration threshold is a longitudinal acceleration threshold under the condition that the accelerated speed is a longitudinal acceleration.

12. The vehicle according to claim 8, wherein the processor is further configured to:
reduce the transmission ratio of the vehicle to the target transmission ratio under the condition that the accelerated speed of the vehicle meets the preset condition and a speed of the vehicle is greater than a speed threshold.

13. The vehicle according to claim 8, wherein the processor is further configured to:
reduce the transmission ratio of the vehicle to the target transmission ratio in response to determining that the accelerated speed of the target object meets the preset condition under the condition that the steering angle of the steering wheel of the vehicle is smaller than the first preset angle.

14. The vehicle according to claim 8, wherein the processor is further configured to:
recover the transmission ratio of the vehicle to a transmission ratio not compensated in a current state under the condition that the steering angle of the steering wheel of the vehicle is smaller than a second preset angle after reducing the current transmission ratio of the vehicle.

15. A non-transitory computer-readable storage medium, storing instructions for controlling steering of a vehicle, the instructions when executed by a processor cause the processor to perform a method comprising:
monitoring an accelerated speed of a target object in front of the vehicle, wherein a moving direction of the target object is a same direction as the moving direction of the vehicle;
detecting an obstacle in front of the vehicle, wherein the obstacle is a static obstacle, or a dynamic obstacle that is moving in a different direction than the moving direction of the vehicle;
reducing a transmission ratio of the vehicle to a target transmission ratio under a condition that the accelerated speed of the target object in front of the vehicle meets a preset condition and the obstacle is detected in front of the vehicle; and
maintaining the transmission ratio of the vehicle in response to determining that the accelerated speed of the target object meets the preset condition under the condition that a steering angle of a steering wheel of the vehicle is greater than or equal to a first preset angle,
wherein the transmission ratio is a ratio of the steering angle of the steering wheel of the vehicle to a steering angle of a wheel of the vehicle.

16. A chip, comprising
a processor and an interface,
wherein the processor is configured to read an instruction so as to execute steps of the vehicle control method according to claim 1.

\* \* \* \* \*

UNITED STATES PATENT AND TRADEMARK OFFICE
CERTIFICATE OF CORRECTION

PATENT NO. : 12,252,012 B2
APPLICATION NO. : 18/071988
DATED : March 18, 2025
INVENTOR(S) : Cheng Jin Page 1 of 1

It is certified that error appears in the above-identified patent and that said Letters Patent is hereby corrected as shown below:

In the Specification

In Column 1, Line 62, delete "limit" and insert -- limiting --, therefor.

In Column 4, Line 64, delete "a1=a–(Ay–Ay′)/BFormula       (1)" and insert -- a1=a–(Ay–Ay′)/B     Formula (1) --, therefor.

In Column 11, Line 17, delete "short range" and insert -- short-range --, therefor.

In Column 14, Line 17, delete "separated" and insert -- separately --, therefor.

In Column 14, Line 19, delete "separated" and insert -- separately --, therefor.

In Column 17, Line 50, delete "Linux," and insert -- Linux™, --, therefor.

In the Claims

In Column 20, Line 43, in Claim 14, delete "current transmission" and insert -- transmission --, therefor.

In Column 21, Line 3, in Claim 16, delete "comprising" and insert -- comprising: --, therefor.

Signed and Sealed this
Twenty-seventh Day of May, 2025

Coke Morgan Stewart
*Acting Director of the United States Patent and Trademark Office*